US006404768B1

(12) United States Patent
Basak et al.

(10) Patent No.: US 6,404,768 B1
(45) Date of Patent: Jun. 11, 2002

(54) METHOD AND APPARATUS FOR SERVING ATM PACKETS/CELLS

(75) Inventors: Debashis Basak, Allison Park; Jay P. Adams, Grove City, both of PA (US)

(73) Assignee: Marconi Communications, Inc., Warrendale, PA (US)

( * ) Notice: Subject to any disclaimer, the term of this patent is extended or adjusted under 35 U.S.C. 154(b) by 0 days.

(21) Appl. No.: 09/103,042

(22) Filed: Jun. 23, 1998

(51) Int. Cl.$^7$ ............................................ H04L 12/28
(52) U.S. Cl. ........................ 370/395.7; 370/395.21; 370/412
(58) Field of Search .................... 370/395, 230, 370/235, 412, 413, 415, 419, 422, 432, 458, 468, 395.1, 395.7, 395.71, 395.72, 395.2, 395.21; 711/1, 4, 100, 147, 154, 170, 171–3, 212

(56) References Cited

U.S. PATENT DOCUMENTS

| | | | | |
|---|---|---|---|---|
| 5,555,265 A | * | 9/1996 | Kakuma et al. | 370/395 |
| 5,610,914 A | * | 3/1997 | Yamada | 370/395 |
| 5,838,681 A | * | 11/1998 | Bonomi et al. | 370/395 |
| 5,862,137 A | * | 1/1999 | Manning et al. | 370/395 |
| 5,936,958 A | * | 8/1999 | Soumiya et al. | 370/395 |
| 6,188,698 B1 | * | 2/2001 | Galand et al. | 370/412 |

* cited by examiner

Primary Examiner—David Vincent
(74) Attorney, Agent, or Firm—Ansel M. Schwartz

(57) ABSTRACT

An apparatus for serving ATM packets, each packet having cells. The apparatus includes a server which provides service to a cell. The apparatus includes a scheduler mechanism which determines which cell is to receive service from the server. The scheduler mechanism is connected to the server. The apparatus includes a shared memory mechanism having a first region for storing cells of a first packet of a first connection and at least a second region for storing cells of a second packet of a second connection. Each region has a dynamic size determined by demands of the corresponding connection. An apparatus for serving ATM packets, each packet having cells. The apparatus includes a server which provides service to a cell. The apparatus includes a scheduler mechanism which determines which cell is to receive service from the server. The scheduler is connected to the server. The apparatus includes a shared memory mechanism which has a buffer management module having buffer administration groups for receiving cells of packets from connections. Each buffer administration group has a dynamic threshold which adapts to changes in traffic conditions. The threshold identifying the number of cells the buffer administration group can store. A method for serving cells of ATM packets.

21 Claims, 6 Drawing Sheets

METHOD AND APPARATUS FOR SERVING ATM PACKETS/CELLS

FIELD OF THE INVENTION

The present invention is related to storing cells of ATM packets for service from a server. More specifically, the present invention is related to storing cells of ATM packets in buffer administration groups until the cells are scheduled for service from a server.

BACKGROUND OF THE INVENTION

Earlier researchers have proposed dynamic threshold schemes limited to a set of destinations ports sharing the same memory and assuming equal sharing among ports. However, sharing of buffer among destinations may not be equal. For example, we may like to dedicate more buffer for a WAN uplink. Further, bandwidth in a given port may be partitioned into virtual pipes for commercial purposes. It may be desirable to dedicate different fraction of buffer to each virtual pipe e.g. proportional to the fraction of bandwidth. Similarly, a virtual pipe may have traffic from separate traffic classes with different buffer requirements. Further traffic from each class may have multiple VCs below it. Thus, there is a need for a more flexible buffer sharing scheme. This scheme should track the natural hierarchy of sharing, offer flexibility for weighted sharing among different destinations during congestion, and be based on dynamic thresholds to allow maximal utilization of shared memory by a single destination.

A scheme by Choudhury and Hahne [A. K. Choudhury and E. L. Hahne. Dynamic Queue Length Thresholds in a Shared Memory ATM Switch. In IEEE Infocom, pages 679–687, March 1996], incorporated by reference herein, allows maximal sharing of memory using dynamic thresholds. However, the scheme restricts memory to be shared equally among ports under congestion.

In the scheme by Choudhury and Hahne, when there is only one switch output port that is very active, it should have access to as much of the share memory buffer as possible. When there are many contending queues, however, it is desired to divide the memory fairly among them. All queues with sufficient traffic to warrant thresholding should obtain the same amount of space, called the control threshold. The control threshold value is determined by monitoring the total amount of unused buffer space.

Each output queue attempts to limit its length to some function of the unused buffer space; output queues with less demand than this can have all the space they wish. At time t, let T(t) be the control threshold and let $Q^i(t)$ be the length of queue i. Let Q(t) be the sum of all the queue lengths, i.e. the total occupancy of the shared memory. Then, if B is the total buffer space, $$T(t) = f(B-Q(t)) = f(B - \Sigma_i Q^i(t)) \quad (1)$$

An arriving cell for queue i will be blocked at time t if $Q^i(t) \geq T(t)$. All cells going to this queue will be blocked until the queue length drops below the control threshold.

The simplest scheme proposed is to set the control threshold to a multiple a of the unused buffer space.

$$T(t) = \alpha(B-Q(t)) = \alpha(B - \Sigma_i Q^i(t)) \quad (2)$$

Typically, α is chosen to be a power of 2 (either positive or negative) to simplify implementation to a shifter.

The above Dynamic Threshold scheme adapts to changes in traffic conditions. Whenever the load changes, the system will go through a transient. For example, when an output port suddenly becomes congested, its queue will grow, the total buffer occupancy will go up, the control threshold will go down, and queues exceeding the threshold will have their arrivals blocked temporarily while they drain, freeing up more cell buffers for the newly active queue. If there are M queues, all very active, then their "steady state" queue lengths will be $$Q^i(t) = T(t) = \frac{\alpha}{1 + \alpha M}(B - S), \quad (3)$$

where S is the space occupied by queues below the control threshold. The amount of memory held in reserve by the algorithm is $$\frac{(B-S)}{1 + \alpha M}.$$

If α=2, for instance, a single queue with no competition is allowed to take ⅔ of the entire shared memory, and ⅓ is held back. If M then increases from 1 to 10, that long queue will drain, and the newly active queues will grow, until all ten stabilize at 2/21 of the buffer, with 1/21 unallocated.

The above scheme deliberately wastes a small amount of buffer space. This "wasted" buffer space actually serves two useful functions. The first advantage of maintaining some spare space at all times is that this provides a cushion during transient periods when an output queue first becomes active. This reduces cell loss during transients. Secondly, when an output queue has such a load increase and begins taking over some of the spare buffer space, this action leads to the buffer allocation mechanism to adjust threshold. If there were no built-in share buffering, then the cell arrival rates and/or loss rates of the individual output queues would have to be monitored to determine when load conditions had changed.

The present invention allows for sharing among ports in some pre-determined proportions, for an arbitrary number of hierarchies, packet traffic and packet level dropping mechanisms viz. EPD, PPD, RED.

SUMMARY OF THE INVENTION

The present invention pertains to an apparatus for serving ATM packets, each packet having cells. The apparatus comprises a server which provides service to a cell. The apparatus comprises a scheduler mechanism which determines which cell is to receive service from the server. The scheduler mechanism is connected to the server. The apparatus comprises a shared memory mechanism having a first region for storing cells of a first packet of a first connection and at least a second region for storing cells of a second packet of a second connection. Each region has a dynamic size determined by demands of the corresponding connection.

The present invention pertains to an apparatus for serving ATM packets, each packet having cells. The apparatus comprises a server which provides service to a cell. The apparatus comprises a scheduler mechanism which determines which cell is to receive service from the server. The scheduler is connected to the server. The apparatus comprises a shared memory mechanism which has a buffer management module having buffer administration groups for receiving cells of packets from connections. Each buffer administration group has a dynamic threshold which adapts to changes in traffic conditions. The threshold identifying the number of cells the buffer administration group can store.

The present invention pertains to a method for serving cells of ATM packets. The method comprises the steps of storing a cell of an ATM packet of a first connection in a first buffer administration group of a shared memory independent of any scheduling considerations. Then there is the step of servicing the cell from the first buffer administration group after a scheduler determines the server connected to the buffer administration group is able to provide service to the cell.

The present invention pertains to a method for serving cells of ATM packets. The method comprises the steps of storing a cell of an ATM packet of a first connection in a first buffer administration group of a shared memory. Then there is the step of changing a dynamic threshold defining the number of cells the first buffer administration group can store. Next there is the step of receiving another cell at the first buffer administration group.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1A:
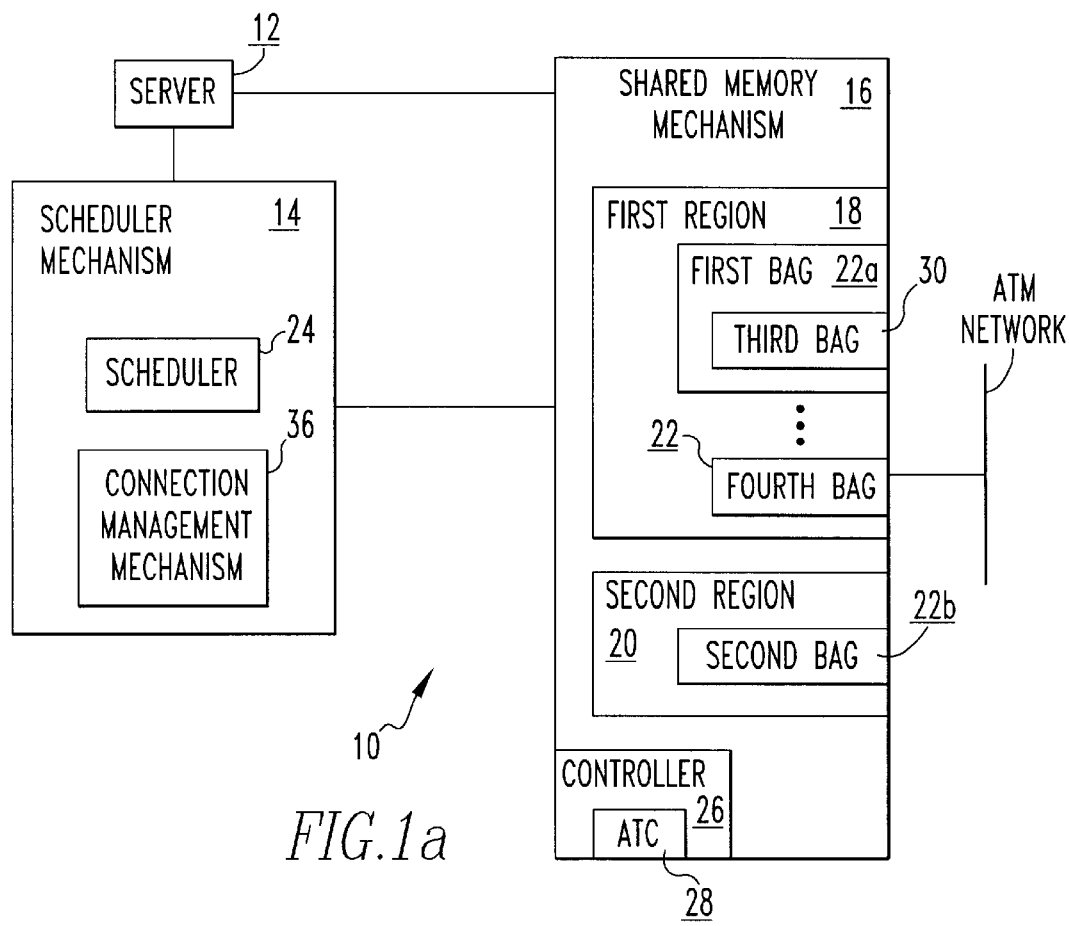
FIG. 1a is a schematic representation of an apparatus of the present invention.

Referring now to the drawings wherein like reference numerals refer to similar or identical parts throughout the several views, and more specifically to figure 1a thereof, there is shown an apparatus 10 for serving ATM packets, each packet having cells. The apparatus 10 comprises a server 12 which provides service to a cell. The apparatus 10 comprises a scheduler mechanism 14 which determines which cell is to receive service from the server 12. The scheduler mechanism 14 is connected to the server 12. The apparatus 10 comprises a shared memory mechanism 16 having a first region 18 for storing cells of a first packet of a first connection and at least a second region 20 for storing cells of a second packet of a second connection. Each region has a dynamic size determined by demands of the corresponding connection.

Preferably, storage of a cell of the first packet in the first region 18 is independent of the scheduler mechanism 14. Preferably, the first region 18 includes a first buffer administration group (BAG) 22a and the second region 20 includes a second buffer administration group 22b. The first connection preferably is a unicast connection and the second connection is a multicast connection. Preferably, the first buffer administration group 22a is comprised of a third buffer administration group 30.

Preferably, the scheduler mechanism 14 includes a scheduler 24 connected to the server 12 for determining which cell is to receive service from the server 12 at a given time and a connection management mechanism 36 connected to the scheduler 24 and the shared memory mechanism 16 for reading the cell chosen by the scheduler 24 from the associated buffer administration group 22 of the shared memory mechanism 16.

The shared memory mechanism 16 preferably includes a controller 26 which defines each buffer administration group 22 in the shared memory mechanism 16. Preferably, the controller 26 assigns each connection to one and only one buffer administration group 22. The controller 26 preferably defines a dynamic threshold which adapts to changes in traffic conditions for each buffer administration group 22, said threshold identifying the number of cells the buffer administration group 22 can store. Preferably, the controller 26 defines a minimum threshold for each buffer administration group 22 which identifies a minimum number of cells for each buffer administration group 22. The controller 26 preferably defines a maximum threshold for each buffer administration group 22 which identifies a maximum number of cells for each buffer administration group 22. Preferably, the controller 26 assigns a weight to each buffer administration group 22 which the controller 26 uses to determine the dynamic threshold of the buffer administration group 22.

The controller 26 preferably tracks the number of cells in each buffer administration group 22 and compares the number of cells in each buffer administration group 22 to each of the thresholds of the buffer administration group 22 to determine if another cell which arrives at the associated buffer administration group 22 is within the thresholds of the associated buffer administration group 22 so the arriving cell can be accepted for storage in the associated buffer administration group 22 or the arriving cell is dropped. Preferably, the controller 26 includes an automatic threshold controller 28 which suggests the dynamic threshold of each buffer administration group 22.

Figure 1B:
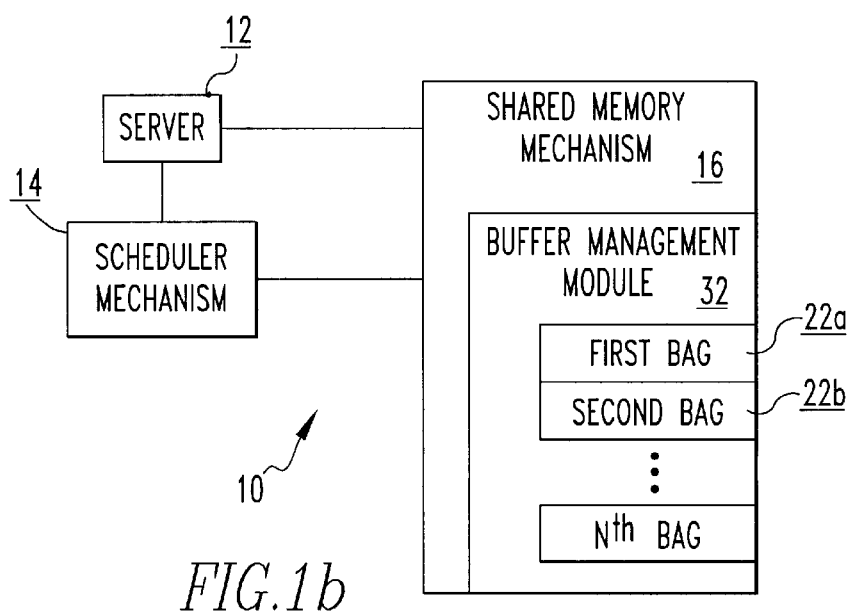
FIG. 1b is a schematic representation of an apparatus of the present invention.

The present invention pertains to an apparatus 10 for serving ATM packets, each packet having cells, as shown in figure 1b. The apparatus 10 comprises a server 12 which provides service to a cell. The apparatus 10 comprises a scheduler mechanism 14 which determines which cell is to receive service from the server 12. The scheduler 24 is connected to the server 12. The apparatus 10 comprises a shared memory mechanism 16 which has a buffer management module 32 having buffer administration groups 22 for receiving cells of packets from connections. Each buffer administration group 22 has a dynamic threshold which adapts to changes in traffic conditions. The threshold identifying the number of cells the buffer administration group 22 can store.

Figure 2A:
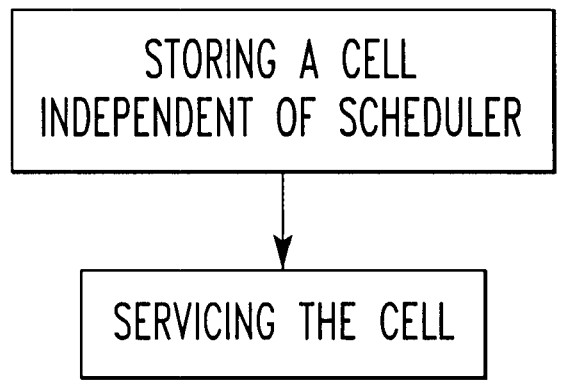
FIG. 2a is a flow chart of a method of the present invention.

The present invention pertains to a method for serving cells of ATM packets, as shown in FIG. 2a. The method comprises the steps of storing a cell of an ATM packet of a first connection in a first buffer administration group 22a of a shared memory independent of any scheduling considerations. Then there is the step of servicing the cell from the first buffer administration group 22a after a scheduler 24 determines the server 12 connected to the buffer administration group 22 is able to provide service to the cell.

Figure 2B:
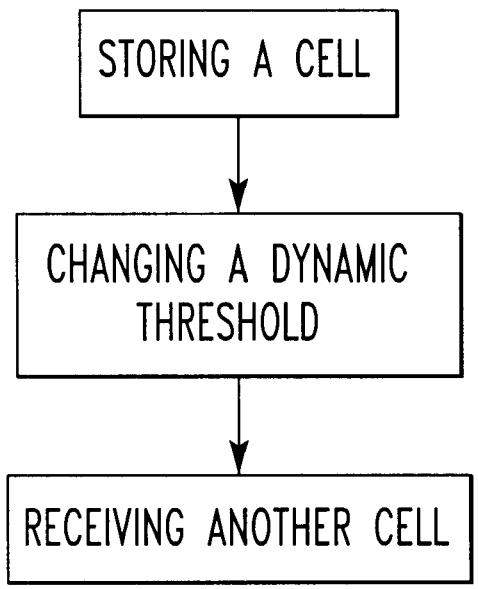
FIG. 2b is a flow chart of a method of the present invention.

The present invention pertains to a method for serving cells of ATM packets, as shown in FIG. 2b. The method comprises the steps of storing a cell of an ATM packet of a first connection in a first buffer administration group 22a of a shared memory. Then there is the step of changing a dynamic threshold defining the number of cells the first buffer administration group 22a can store. Next there is the step of receiving another cell at the first buffer administration group 22a.

In the operation of the preferred embodiment, the top buffer administration group level of the hierarchy is first described. In this embodiment, a separate constant ($\alpha$s) exists for each different buffer administration group. This allows a separate threshold for each buffer administration group. For greater flexibility, these constants can be modifiable by software.

$$T^i(t) = \alpha_i(B - Q(t)) = \alpha_i(B - \Sigma_i Q^i(t)) \tag{4}$$

Figure 7:
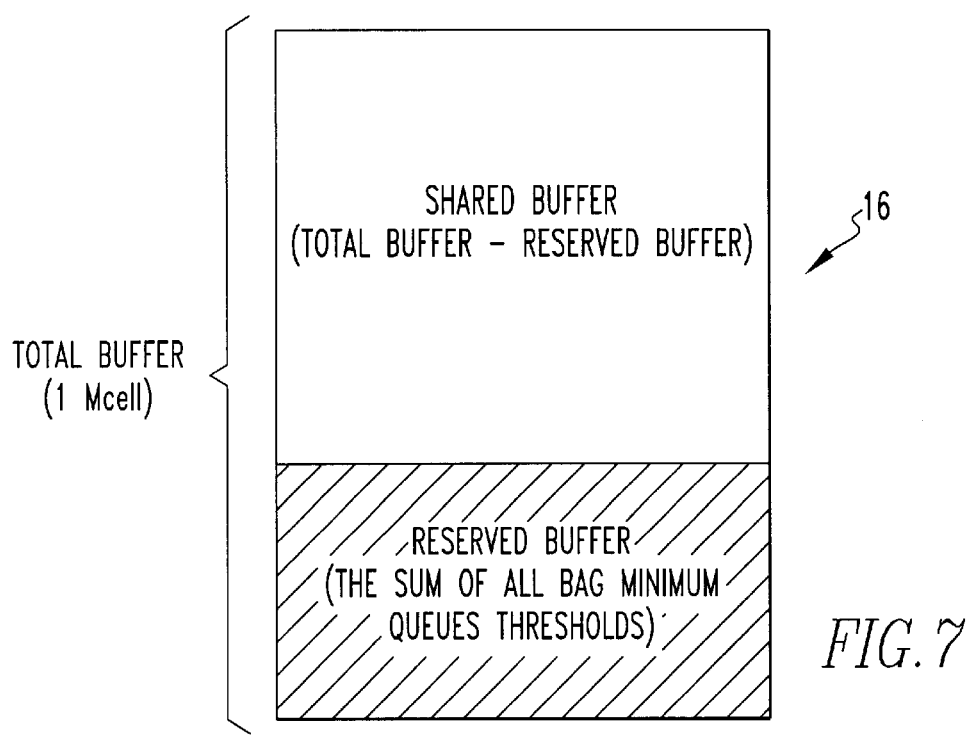
FIG. 7 is a schematic representation of a shared memory.

See FIG. 7. The value of $\alpha_i$ can still be chosen to be different power of 2 (either positive or negative) to simplify implementation as suggested above.

The above Dynamic Threshold scheme adapts to changes in traffic conditions. Whenever the load changes, the system will go through a transient. For example, when connections into a buffer administration group suddenly becomes congested, its queue will grow, the total buffer occupancy will go up, the control threshold will go down, and queues exceeding the threshold will have their arrivals blocked temporarily while they drain, freeing up more cell buffers for the newly active buffer administration group queue. If there are M buffer administration group queues, all very active, then their "steady state" queue lengths will be $$Q^i(t) = T^i(t) = \frac{\alpha_i}{1 + \sum_j} (B - S), \tag{5}$$

where S is the space occupied by queues below their respective control thresholds. The amount of memory held in reserve by the algorithm is $$\frac{(B - S)}{1 + \sum_j \alpha_j}.$$

The following example illustrates this:

EXAMPLE 1

Consider a shared memory of 15000 cells serving 4 destinations. During congestion it is desired that the memory be shared in the ratio of 8:4:2:1 among the destinations, respectively. Associate proportional weights of 32:16:8:4, respectively. For the first destination, the limit to which it can occupy the buffer if its cells were only present, based on Eqn. 5 3:32/(1+32) *15K=14531 cells. The parameters of S=0 and M=1 are assumed. For other destinations, these numbers are 14117, 13333, and 12000 cells, respectively. Thus, it can be observed in absence of contention a given destination can use up to a significant portion of the buffer space. In presence of congestion to all destinations, similar numbers, based on Eqn. 5, are derived as 7869, 3934, 1967, and 983 cells, respectively. Note that these are proportional to the set weights.

The buffer is to be shared among a set of ports, in a port among virtual pipes, in a virtual pipe among classes, and in a class among VCs. A different constant $\alpha$ is assigned at each node of the hierarchy. As discussed above a constant $\alpha_i$ is assigned to port i and compute $T_i(t) = a_i(B - Q(t))$ as the threshold for all traffic to port i. This ensures that under congestion and steady state $$\frac{\alpha_i}{1 + \sum_j \alpha_j}$$

share of the buffer space is ensured to this port. Under port i, $T_i(t)$ is used as the maximum assignable buffer space at time t. For a virtual pipe j under this port the threshold is determined as $$T_{i,j}(t) = \alpha_{i,j}(T_i(t) - Q_i(t)), \tag{6}$$

where $\alpha_{i,j}$ is the constant assigned to virtual port j under port i and $Q_i(t)$ is the queue length of cells to port i at time t. This can be generalized easily to 1 levels with $$T_{i_1, i_2, \ldots, i_l}(t) = \alpha_{i_1, i_2, \ldots, i_l}(T_{i_1, i_2, \ldots, i_{l-1}}(t) - Q_{i_1, i_2, \ldots, i_{l-1}}(t)). \tag{7}$$

Figure 3:
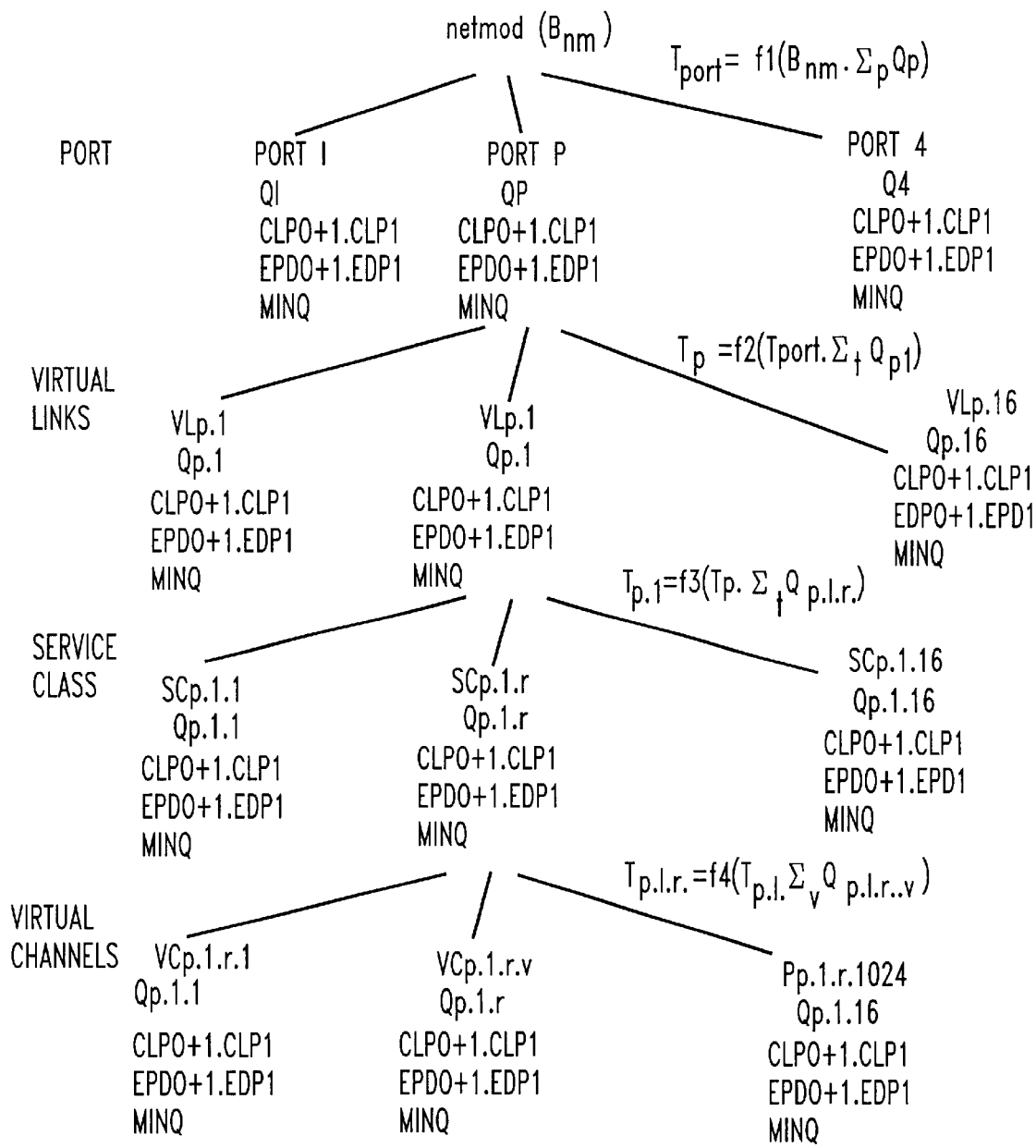
FIG. 3 depicts a sample scheme for hierarchal buffer thresholds matching the physical hierarchy of ports, virtual pipes, service class, VCs. Buffer administration groups can be associated to ports/VPs/service class.

An incoming cell arriving at time t for a given destination $(i_1, i_2, \ldots, i_l)$ is checked against all thresholds $T_{i_1}(t)$, $T_{i_1, i_2}, \ldots, T_{i_1, i_2, \ldots, i_l}$. The check is done sequentially down the hierarchy. While the comparison is being made at level r the threshold at level r+1 is computed. A cell is dropped at a level r if the threshold is exceeded and further checks down the hierarchy are not necessary. The basic hierarchy of the above instantiation of scheme is depicted in FIG. 3.

Figure 6:
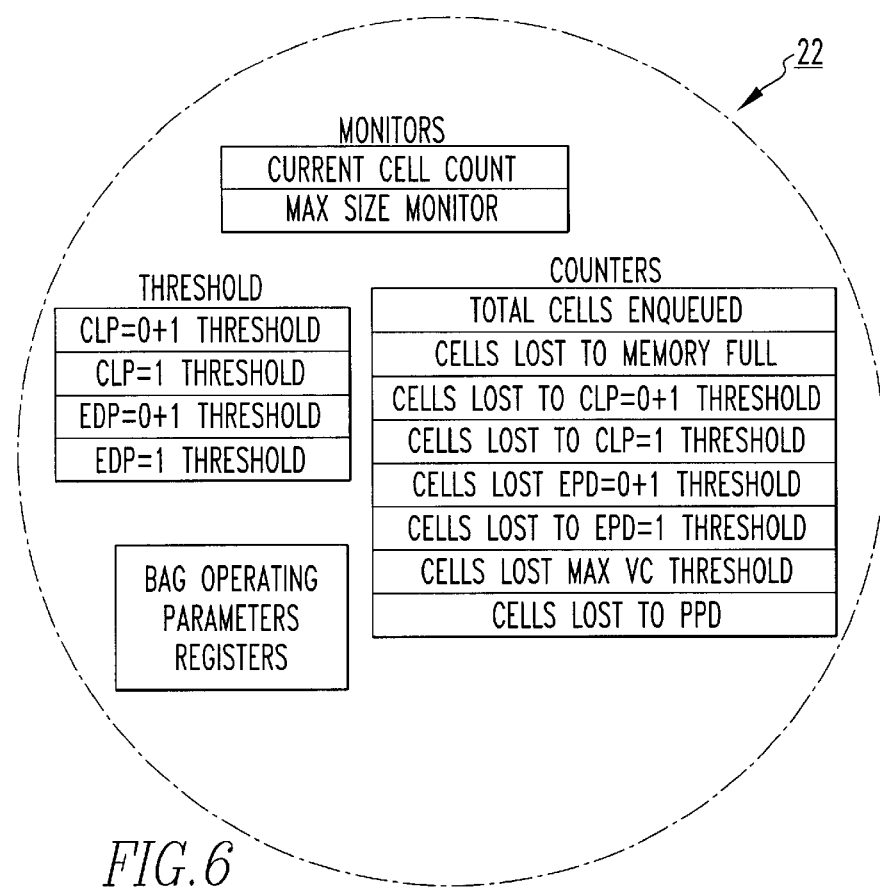
FIG. 6 is a schematic representation of a buffer administration group, assuming two-level hierarchy.

FIG. 6 discusses typical thresholds attached to BAGs/VCs. The

Per BAG CLP=0+1 Threshold

The CLP=0+1 Threshold is the maximum buffer size threshold. No cells will be accepted into the buffer when a connections queue size (or buffer administration groups 22 queue size in buffer administration group 22 mode) is greater than or equal to this threshold.

The Per BAG CLP=1 Threshold

When a connection queue size (or buffer administration groups 22 queue size in buffer administration group 22 mode) is greater than or equal to the CLP=1 Threshold and the CLP bit of the current cell is greater than or equal to the CLP=1 threshold, then the cell will be rejected. As part of the connection state information, each connection will have the ability to ignore this threshold. In this case, the cell would still be subject to the CLP=0+1 threshold which cannot be disabled on a per-connection basis.

The Per BAG thresholds Applicable to Packet Drop Schemes (Early Packet Drop (EPD)/Random Early Drop (RED)

Although discussion below refers to $EPD_{0+1}$ threshold, it is equally applicable to any other packet drop threshold. When a connection queue size (or buffer administration groups 22 queue size in buffer administration group 22 mode) is greater than or equal to the EPD=0+1 Threshold, the connections "EPD=0+1 Enable Bit" is set, and the current cell is the first cell of a packet, then the cell will be rejected. Once the first cell of a packet is dropped, the remaining cells of a packet will continue to be dropped without regard to the thresholds. The thresholds will not be used again until the first cell of the next packet is requesting admission into the buffer.

For deriving $CLP_1$, $EPD_{O+1}$, and $EPD_1$ thresholds from $CLP_{O+1}$ threshold, consider the threshold $T_{i_1,i_2,\ldots,i_r}$ at a node $(i_1, i_2, \ldots, i_r)$ in the destination hierarchy as the $CLP_{O+1}$ threshold. The other thresholds, namely, $CLP_1$ and $EPD_{O+1}$, are computed as predefined fractions of $T_{i_1,i_2,\ldots,i_r}$. As an illustration, $CLP_1=$, 0.5 $CLP_{O+1}$, $EPD_{O+1}=0.5$ $CLP_{O+1}$, and $EPD_1=0.25$ $CLP_{O+1}$.

Numerous schemes have been proposed reserving a minimum space [P. Newman. Traffic Management for Local Area Networks. In *IEEE Communications Magazine*, volume 32, pages 44–50. Aug. 1994], incorporated by reference herein, for each destination to ensure no destination being blocked out of buffer space. As discussed above, the buffer sharing scheme in Choudhury intentionally wastes some buffer space to allow new traffic flows to enter the buffer.

Similarly, space could be viewed at each level of the hierarchy. One needs to ensure that space reserved at a node in level i is greater or equal to the sum of space reserved by all its immediately neighboring nodes in level below i. For example, assuming a scheme with buffer administration groups having VCs under buffer administration groups, the reserved space in the buffer administration group $\geq \Sigma$ VC reserved space.

In regard to the maximum bound of a buffer used by a destination, in the literature numerous schemes have been proposed putting a maximum bound [P. Newman. Traffic Management for Local Area Networks. In *IEEE Communications Magazine*, volume 32, pages 44–50. August 1994], incorporated by reference herein, for the amount of buffer space each destination can have access. Such bounds are more important in static threshold schemes. With dynamic thresholds, maximum bounds are no longer required. However, maximum thresholds are included for two reasons:

In a given switch with very high buffering e.g. 1 M cells, allowing one connection to use the full buffer implies it can see a very high cell delay through the switch. For example, for an OC-3 outgoing port it can be as large as 2.86 $\mu$sec$\times$1 M =2.86 secs. For comparison, it may be noted that TCP timers expire in 0.5 secs. Thus, depending on outgoing port speed and maximum delay tolerable by application there may not much point in allowing dynamic thresholds to go beyond a certain maximum.

It allows the flexibility for a mechanism for implementing static thresholds scheme if desired.

In regard to buffer management issues for multicast connections, the following are the issues that need to be addressed:

How many maximum destinations can there be in shared memory? Typically, it should be the number of ports. However, with multiple virtual pipes within a port, it may be required to replicate cells within them. Thus, with 4 ports and 16 virtual pipes per port a multicast cell may need to be replicated 64 times.

How and when is a multicast cell buffered? Ideally, for an incoming cell to multiple destinations, M, the decision to buffer the cell for a given destination should be based on an independent threshold check. However, given M could be as large as 64, this may require 64 independent checks to be made for a single cell and similarly 64 copies of the cell to be buffered. This is clearly not feasible in the few hardware cycles (for an aggregate speed of 2.5 Gbps—this requires a cell-time of 424/2.5=2.8 $\mu$s/16=0.175 $\mu$s) available in the limited hardware resources.

Two alternatives for buffering multicast cells are the following.

1. Maintaining separate VC-queue of pointers-to-cells at each destination

Instead of replicating multicast cells to each destination, only the pointer is replicated and inserted into VC-queue of pointers maintained at each destination. The scheme still requires 64 checks to be done at a rate of 2.5 Gbps. Destinations which have exceeded their thresholds or are currently doing PPD or EPD do not store the pointer to the cell. Along with the multicast cell a record of number of reads to be done on it is also maintained. Once the read counter drops to zero the multicast cell space can be released.

2. Maintaining only a read pointer at each destination

The above scheme may require 64 separate pointer updates for each multicast cell. This is not practical at current hardware speeds, and leads towards a different scheme. When a multicast cell arrives, it is buffered at the end of the multicast VC queue. Each destination maintains a separate read pointer to read cells from this list. The scheme, referred to as single write multiple reads (SWMR), is space-efficient as it requires exactly one copy of the cell to be stored and no separate pointer updates for each destination.

However, a multicast cell is accepted only if ALL its destinations can accommodate the cell and there is no ongoing PPD or EPD on the VC. For a larger destination set, such as 64, the above scheme can lead to poor multicast performance even under conditions of nominal congestion. Furthermore, the required 64 threshold checks to be done at a rate of 2.5 Gbps is still difficult to implement.

Figure 5:
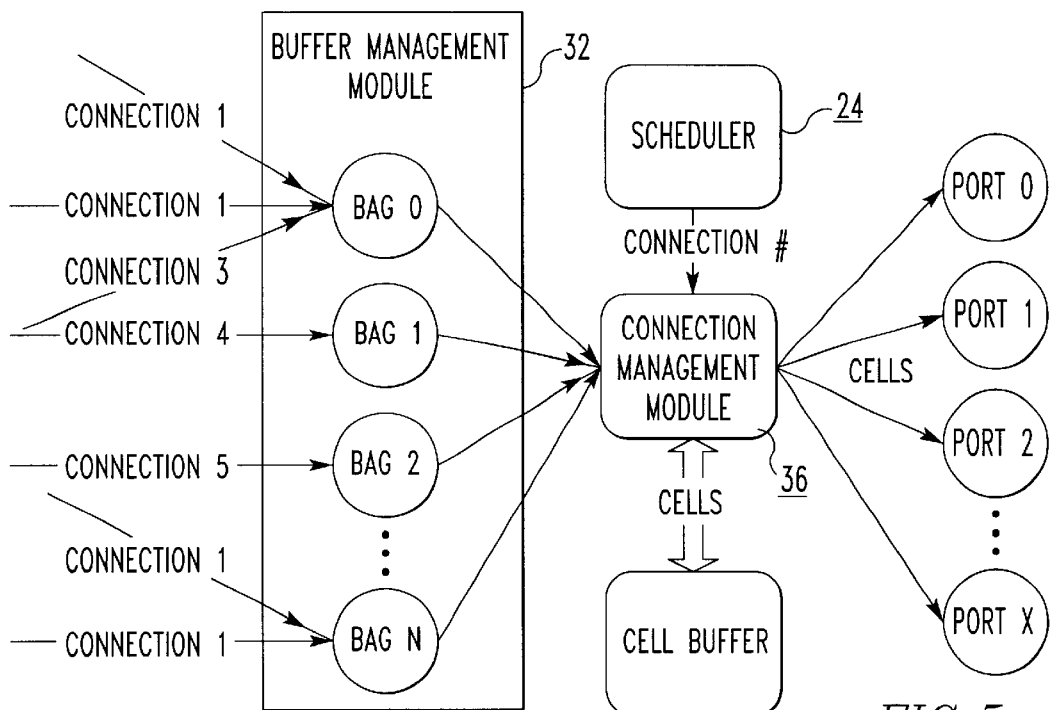
FIG. 5 is a schematic representation of buffer administration groups, assuming two-level hierarchy.

Herein, a different preferred scheme for multicasting is described. This relies on decoupling buffer sharing based on physical entities such as port/pipes and adopting a more general approach. Under this scheme, buffer sharing at a switch can be defined flexibly based on application needs, etc. This allows buffer space to be used as a premium and distributed based on bidding. At the highest level of this scheme, sharing entities are referred to as buffer administrative groups 22. FIG. 5 shows the fact that the buffer management functions are independent of the part to which the connection is destined. In fact, with multicast connections, a single buffer administration group will serve multiple ports.

The apparatus 10 does not have dedicated buffer thresholds per port or class. Instead, the apparatus 10 supports a Buffer Management Module that contains buffer administration groups 22. Buffer administration groups 22 provide a powerful method of customizing buffer usage. Every connection, unicast or multicast, gets assigned to one (and only one) of N buffer administration groups 22, see FIG. 3. Each buffer administration group 22 tracks the number of cells in the buffer for all connections assigned to that buffer administration group 22. This counter is used to compare against several thresholds that are maintained within the buffer administration group 22 to determine if the arriving cell should be admitted to the buffer.

Once a cell enters the buffer, the buffer administration groups 22 play no role in the order a cell is serviced for transmission, the scheduler 24 alone determines the transmission order of the cells. The scheduler 24 issues a request to the Connection Management Module and the corresponding cell is read from the buffer.

Figure 8:
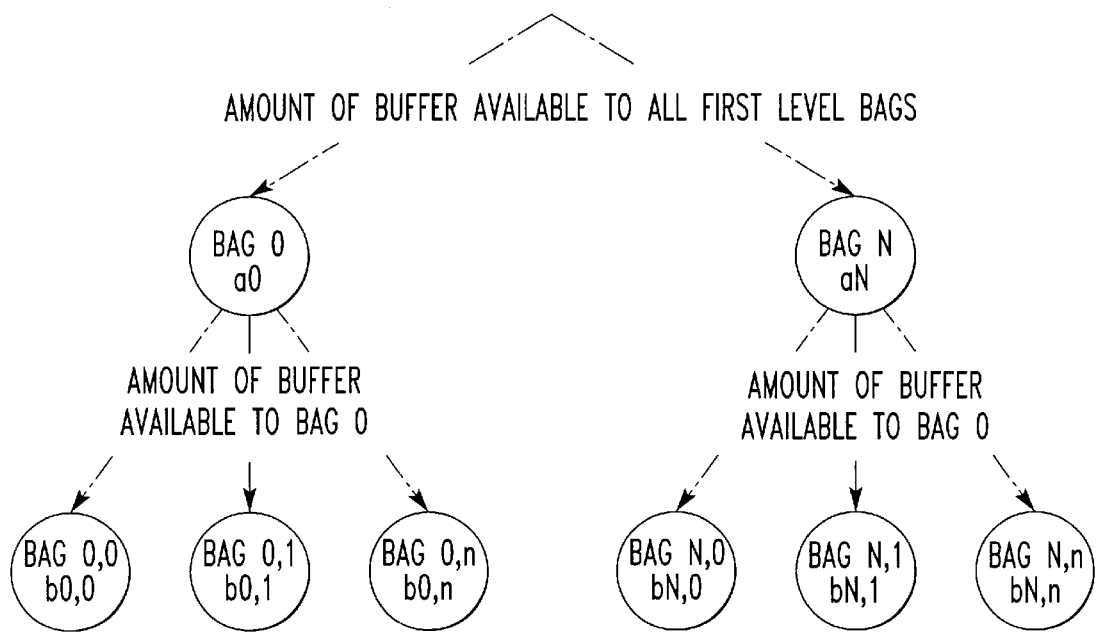
FIG. 8 is a diagram showing a two-level hierarchy.

Similar to the scheme discussed in FIG. 3, multi-level hierarchy of buffer administration groups 22 can be employed to support finer granularity of dynamic sharing. The number of buffer administration groups 22 at any level is flexible and soft configurable to fit the application or customer needs. In the description of the ability of this algorithm to extend into several hierarchies, if a two-level implementation is arbitrarily chosen, a diagram can be drawn as shown in FIG. 8. Also assume that the second level corresponds to the VC level. In FIG. 8, the first level buffer administration groups receive the current available buffer amount and calculate the amount of buffer that each first level buffer administration group can use. This amount is based in each buffer administration groups "α" variable (α0–αN). Then each first level buffer administration group passes the newly calculated share of the buffer space to the second level buffer administration groups, each of those buffer administration groups calculates the share of the buffer that is available to them, based in the "b" parameter that is unique to each of the send level buffer administration groups.

There is a disadvantage to this type of implementation however. It becomes difficult to implement because a single connection would have to be added to each buffer administration group in its hierarchy. This could be impossible under certain bandwidth requirements. Also, since there are many VCs (connections) that must be supported in a switch, the number of second level buffer administration groups would also be very numerous.

Figure 9:
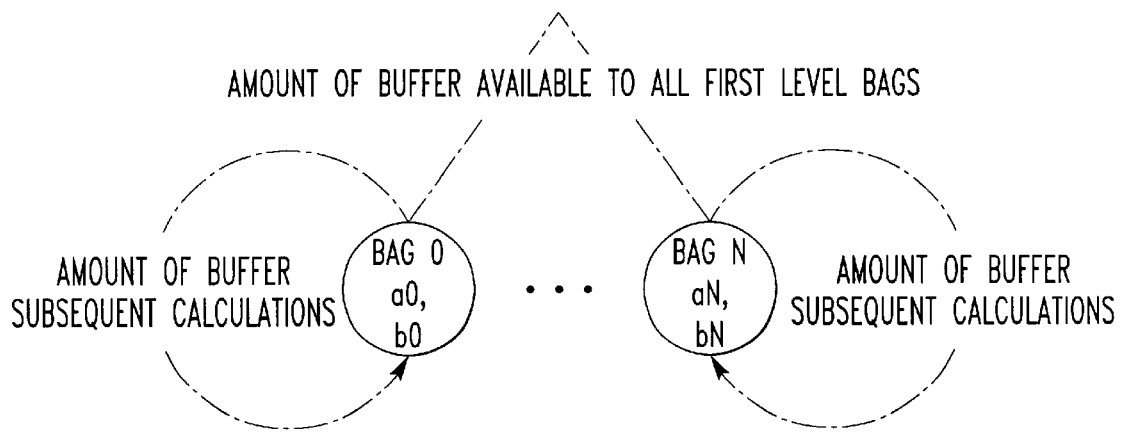
FIG. 9 is a diagram showing a modified hierarchy implementation.

An alternative method of approximating a two-level hierarchy is as follows. Refer to FIG. 9. In this figure, there is only one level of buffer administration groups, however, there are multiple parameters in each buffer administration group ("α" and "β"). In this implementation, the amount of buffer available to all buffer administration groups is passed to each buffer administration group and they each independently calculate the threshold for all connections assigned to that buffer administration group (the calculation is actually only performed for a certain buffer administration group if a cell is currently arriving destined for that buffer administration group). If the threshold that is calculated is lower than the total number of cells in the queue for that buffer administration group, then the cell is dropped. If the threshold is higher, then the remaining buffer is used for a second iteration of the algorithm in the same buffer administration group. In the second iteration, the parameter "β" is used in place of "α" and the amount of buffer consumed by the particular VC that the incoming cell belongs to is used to compare against the resulting threshold. This method requires less resources to implement than does the method of FIG. 8, but sacrifices individual control over the second level (because all share the same "β" parameter).

Although the buffer administration group 22 scheme is general enough to support multiple levels, in the initial implementation, the details of implementing a two-level hierarchy is focused upon. Incoming new connections, based on application or customer group considerations, are associated with a buffer administration group 22. The buffer space available to a buffer administration group 22 is shared by VCs under it. Each buffer administration group 22 has an associated weight, denoted by $\alpha_{BAG}$, which is used to determine the buffer administration group 22 buffer threshold based on the discussion above. For the second level, a buffer administration group is considered to contain exactly 1 VC. Thus, in the second level, buffer administration groups and VCs are interchangeable and the actual sharing is two-level: at the buffer administration group 22-level and for a buffer administration group 22 at the connection level. Under congestion two cases can be considered: a) the buffer administration group 22 buffer space is shared equally among active connections or b) it is shared in a weighted manner. It is assumed that connections placed together in a buffer administration group 22 have similar characteristics and hence there is equal sharing of buffer space among them. With added complexity, the scheme can be easily extended to accommodate weighted sharing at connection level.

Figure 4:
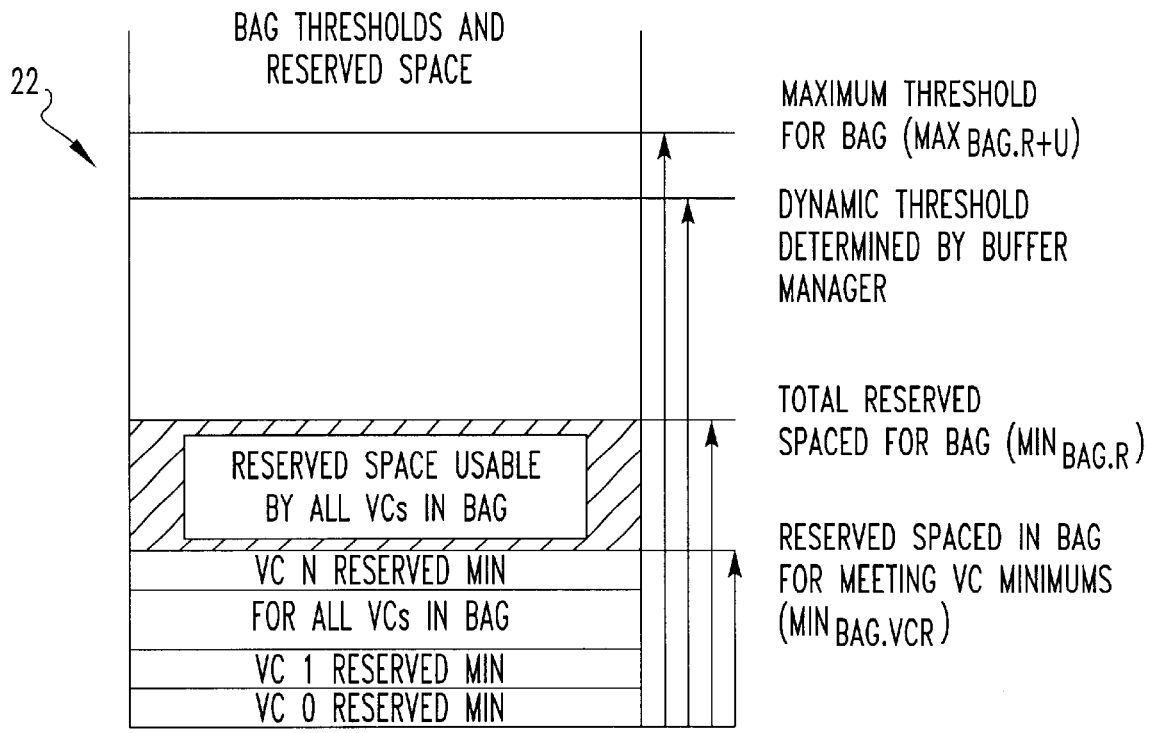
FIG. 4 depicts buffer administration group buffer thresholds and buffer administration group/VC-level minimum reserved spaces.

Besides the dynamic threshold for a buffer administration group 22, based on $\alpha_{BAG}$, two static thresholds are provided: $MAX_{BAG,R+U}$ and $MIN_{BAG,R}$ for reasons similar to those discussed earlier. Both these parameters are assumed software configurable. In these and the remaining notation herein, a parameter with suffix containing R indicates it is related to reserved space, U indicates unreserved space, and R+U indicates both reserved and unreserved space. Similarly, a parameter with suffix containing TOT indicates it is related to the total buffer space, buffer administration group 22 indicates relation to a given buffer administration group 22, and VC indicates relation to a connection. For example, the parameter $MIN_{BAG,R}$ represents the minimum reserved space for a given buffer administration group 22. Similarly, the parameter $MAX_{BAG,R+U}$ represents the maximum buffer threshold for a given buffer administration group 22 for both reserved and unreserved space. These thresholds and other VC-level reserved spaces in the buffer administration group 22 are depicted in FIG. 4.

The minimum space reserved for a buffer administration group 22 ($MIN_{BAG,R}$) can be shared in two ways among its contained buffer administration groups (VCs). Part of this reserved space is preserved to meet the minimum space requirements for the VCs inside the buffer administration group 22. Let reserved space for a VC be denoted by $MIN_{VC,R}$. This parameter can be software configured differently for different VCs. Let $MIN_{BA,G,VC,R}$ be a parameter to keep track of the sum total of such space. This leads to:

$$MIN_{BAG,VC,R} = \Sigma_{VCEBAG} MIN_{VC,R}. \quad (8)$$

The remaining reserved space in the buffer administration group 22, ($MIN_{BAG,R} - MIN_{BAG,VC,R}$), is unreserved at the VC-level and can be used by any VC. Such space in the buffer administration group 22 is depicted in gray in FIG. 4. No restrictions on sharing this reserved space is imposed among the VCs. This can allow even a single VC to exhaust such reserved space. In the following subsection we detail this scheme. While setting the values for above parameters, software needs to ensure that the sum of the reserved space at VC-level does not exceed the total reserved space for the buffer administration group 22 i.e.:

$$MIN_{BAG,R} \geq MIN_{BAG,VC,R}. \quad (9)$$

For convenience, the following is a summary of notation used herein:

TABLE 1

Provides a summary of the main parameters associated with a buffer administration group 22

| | Min-Max Parameters |
|---|---|
| $B_{TOT,R+U}$ | Total space (reserved + unreserved) in buffer (1M cells). |
| $MAX_{BAG,R+U}$ | Max allowed usage of space for VCs in a BAG 22. |
| $MIN_{BAG,VC,R}$ | Reserved space for VCs in a BAG 22. |
| $MIN_{BAG,R}$ | Reserved space for BAG 22. |
| $MIN_{TOT,R}$ | Total reserved space in buffer for all BAGs 22. ($=\Sigma_{BAGs} MIN_{BAG,R}$). |
| $MAX_{VC,R+U}$ | Max allowed usage of space for a VC. |
| $MIN_{VC,R}$ | Min reserved space for a VC. |

TABLE 1-continued

Provides a summary of the main parameters associated with a buffer administration group 22

Thresholds to be computed:

| | |
|---|---|
| $T_{BAG,U}$ | Threshold for unreserved space for all VCs in a BAG 22. |
| $T_{VC,U}$ | Threshold for unreserved space for a VC. |
| $T_{VC,R+U}$ | Total threshold for space for a VC. |

Queue lengths to be maintained:

| | |
|---|---|
| $Q_{VC,R+U}$ | Current queue length for a VC. |
| $Q_{BAG,R}$ | Current utilized reserved space in a BAG 22. |
| $Q_{BAG,U}$ | Current utilized unreserved space in a BAG 22. |
| $Q_{TOT,R}$ | Current utilized reserved space in all BAGs 22. |
| $Q_{TOT,U}$ | Current utilized unreserved space in all BAGs 22. |

Parameters to compute other thresholds:

| | |
|---|---|
| $f_{BAG}^1$ | $CLP_1$ threshold as fraction of $CLP_{0+1}$ threshold. |
| $f_{BAG}^2$ | $EPD_{0+1}$ threshold as fraction of $CLP_{0+1}$ threshold. |
| $f_{BAG}^3$ | $EPD_1$ threshold as fraction of $CLP_{0+1}$ threshold. |

Each buffer administration group 22 can have a portion of the buffer set aside to be dedicated solely for the use by the connections within the buffer administration group 22.

The buffer administration group 22 threshold is determined for maximum unreserved space usage by its VCs, denoted by $T_{BAG,U}$, as the sequence of the following two computations:

$$T_{BAG,U} = \alpha_{BAG}((B_{TOT,R+U} - MIN_{TOT,R}) - Q_{TOT,U}). \quad (10)$$

This derived parameter for the maximum threshold is adjusted to allow for unreserved space for the buffer administration group 22 ($MAX_{BAG,R+U} - MIN_{BAG,R}$):

$$T_{BAG,U} = min(T_{BAG,U}, (MAX_{BAG,R+U} - MIN_{BAG,R})). \quad (11)$$

where $\alpha_{BAG}$ is the weight associated with a given buffer administration group 22. $\alpha_{BAG}$ may be chosen to be a power of 2 for ease of implementation as register shift operations. For example, to implement a weight of 64 (6 left shift operations) the value of 6 is stored which can be done in 3 bits. From earlier discussion, the following reserved space in the buffer administration group 22, ($MIN_{BAG,R} - MIN_{BAG,VC,R}$), is unreserved at the VC-level and can be used by any VC. The $T_{BAG,U}$ parameter is further adjusted for this factor to derive the total unreserved space for use by VCs. This leads to:

$$T_{BAG,U} = T_{BAG,U} + (MIN_{BAG,R} - MIN_{BAG,VC,R}). \quad (12)$$

The buffer administration group 22 can be operated in two modes. In one mode, VC-level thresholds are not computed, using the buffer administration group 22 level threshold and MAX VC allowance to determine if a cell is to be let into the buffer. In another scheme, VC-level thresholds are computed. The VC-level threshold is expected to be more fair among sessions in a buffer administration group 22. However, when the VC-thresholds are small it may lead to very low goodput in the system, with most packets being shredded. There may be some instances where thresholds should not be calculated down to the per-VC level, so each buffer administration group 22 can be programmed to apply the thresholds against the per-connection buffer size or the per-buffer administration group 22 buffer size. (Such an example is for VP connections, where an individual per-VC buffer size is not maintained for each VC).

The above unreserved buffer threshold for VCs in a buffer administration group 22, $T_{BAG,U}$, is divided among its connections in a dynamic manner. The VC threshold is determined as the sequence of the following computations:

$$T_{VC,U} = \beta(T_{BAG,U} - Q_{BAG,U}). \quad (13)$$

In case the computed threshold is less than or equal to the queue length, the above equation can lead to a less than or equal to zero VC threshold. The VC threshold is reset to zero.

The above situation (with buffer administration group 22 threshold being smaller than buffer administration group 22 queue length) is only expected as a transient phase. With cells not being allowed into the heavy VCs (due to small threshold), the buffer administration group 22 queue length is expected to decrease, leading to buffer administration group 22 threshold being greater than or equal to buffer administration group 22 queue length.

The following other VC thresholds are derived as follows:

$CLP_1 = T_{VC,R+U} * f^1_{BAG}$ $EPD_{0+1} = T_{VC,R+U} * f^2_{BAG}$ $EPD_1 = T_{VC,R+U} * f^3_{BAG}$

The cell-acceptance condition for a given VC is executed as follows:

if ($Q_{VC,R+U} \leq T_{VC,R+U}$) accept call else reject call

EPD/PPD checks can also be performed. The pseudo-code in the Appendix describes the above steps in more detail.

The following are some requirements as part of using the scheme:

Setting/changing the maximum threshold, $MAX_{BAG,R+U}$ and reserved space, $MIN_{BAG,R}$.

Ensuring the total reserved space for all buffer administration groups 22, $MIN_{TOT,R} = \Sigma_{BAGs} MIN_{BAG,R}$.

Setting/changing the buffer administration group 22 weight, $\alpha_{BAG}$, depending on buffer space requirements.

Setting/changing the maximum threshold, $MAX_{VC,R+U}$, for each new connection, or making it point to a one of a set of fixed values.

Setting/changing the reserved space, $MIN_{VC,R}$, for each new connection, or making it point to one (of a set of) fixed value(s).

For any given buffer administration group 22 or VC, ensuring maximum is greater than minimum: $MAX_{BAG,R+U} > MIN_{BAG,R}$ and $MAX_{VC,R+U} > MIN_{VC,R}$.

Suggested possible usages of the above scheme are the following. The actual number of buffer administration groups 22 to be supported would be implementation dependent. Without loss of generality, the examples below consider 256 groups at top level.

EXAMPLE 1

Separate unicast and multicast buffer administration groups 22.

As a first example, a buffer administrator may consider separating the buffer usage by port/virtual link/2 priorities for all unicast traffic. Such a scheme requires 4×6×2=128 groups. Further, the multicast traffic may be split based on the cardinality of its destination set (up to 63 cases) and 2 priorities, leading to 126 groups. In this case, the total number of buffer administration groups 22 required add up to 254.

Example 2

Based only on commercial/customer groups/entities.

For example, segregating the buffer usage of MCI from AT&T and so on may be considered. As an illustration let each commercial entity request a virtual link. Given a maximum of 64 virtual links, this leads to at most 64 commercial entities. The buffer usage under each commercial entity could be further separated based on priorities. Assuming 4 priority bins for each commercial entity this leads to a total of 256 buffer administration groups 22.

The buffer administration group 22 weights control the sharing of the buffer resources. Let there be a total of 1M cells. Let the minimum buffer reserved per buffer administration group 22 be 1K cells. Given 256 buffer administration groups 22 this leads to approximately 750K cells of buffer to be allocated dynamically. Without loss of generality, let the smallest unit of guaranteed buffer space to a buffer administration group 22 be 1K cells. Thus, 750K cells correspond to a total of 750 units of buffer space. The buffer manager allocating weights in such units, can keep track of the remaining units. In case of congestion with all 750 units of buffer space being allocated, a buffer administration group 22 receives its requested share of the dynamic buffer space. With fewer units allocated, it receives more.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

APPENDIX

The following code describes the updation of the queuelengths while adding or deleting a cell:

```
/* Updating queuelengths while adding a cell to a VC=/
Q_{VC,R+U}=Q_{VC,R+U}+1;
Q_{BAG,R+U}=Q_{BAG,R+U}+1;
if (Q_{VC,R+U}≦MIN_{VC,R})
    Q_{BAG,R}=Q_{BAG,R}+1; (optional)
    Q_{TOT,R}=Q_{TOT,R}+1; (optional)
else
    if (Q_{BAG,R+U}≦MIN_{BAG,R})
        Q_{BAG,R}=Q_{BAG,R}+1; (optional)
        Q_{TOT,R}=Q_{TOT,R}+1; (optional)
    else
        Q_{BAG,U}=Q_{BAG,U}+1;
        Q_{TOT,U}=Q_{TOT,U}+1;
```

With the optional parts removed the above code simplifies to:

```
Q_{VC,R+U}=Q_{VC,R+U}+1;
Q_{BAG,R+U}=Q_{BAG,R+U}+1;
if (Q_{VC,R+U}>MIN_{VC,R}) AND (Q_{BAG,R+U}>MIN_{BAG,R})
    Q-BAG,U=Q_{BAG,U}+1;
    Q_{TOT,U}=Q_{TOT,U}+1;
/* Updating queuelengths while deleting a cell from a VC=/
Q_{VC,R+U}=Q_{VC,R+U}-1;
Q_{BAG,R+U}=Q_{BAG,R+U}-1;
if (Q_{VC,R+U}<MIN_{VC,R})
    Q_{BAG,R}=Q_{BAG,R}-1; (optional)
    Q_{TOT,R}=Q_{TOT,R}-1; (optional)
else
    if (Q_{BAG,R+U}<MIN_{BAG,R})
        Q_{BAG,R}=Q_{BAG,R}-1; (optional)
        Q_{TOT,R}=Q_{TOT,R}-1; (optional)
/* Step 1: Table lookups to determine VC and BAG to which this cell belongs.
Step 2: Compute BAG threshold and from it compute CLP0+1(T_{VC,R+U}) VC threshold. */
Step 3: Compare queuelength against various thresholds. */
Step 3.a.1: check first for non-packet threshold: CLP0+1 */
drop_cell=false;
if (Q_{VC,R+U}≧T_{VC,R+U})
    drop_cell=true;
    VC->drop_remaining_packet_flag=true;
/* Step 3.a.2: check next for non-packet thresholds: CLP1 */
if ((cell.CLP==1) && (Q_{VC,R+U}≧(T_{VC,R+U}=f^1_{BAG})))
    drop_cell=true;
    VC->drop_remaining_packet_flag=true:
/* Step 3.b: if packet VC, check packet thresholds & update counters */
if (packet traffic)
    if (VC->drop_remaining_packet_flag)
        drop_cell=true;
    /* if first cell */
    if (VC->expect_first_cell_flag==true)
        VC->expect_first_cell_flag=false;
        /* check EPD0+1 threshold */
        if (Q_{VC,R+U}≧(T_{VC,R+U}=f^2_{BAG}))
            drop_cell=true;
            VC->drop_remaining_packet_flag 32 true;
        /* check EPD1 threshold for CLP1 cell*/
        if ((cell,CLP==1) && (Q_{VC,R+U}≧(T_{VC,R+U} * f^3_{BAG})))
            drop_cell=true;
            VC->drop_remaining_packet_flag=true;
    /* update EPD counter */
    if (drop_cell==true)
        EPD_cntr++;
    /* if last cell */
    if (last cell of packet)
        VC->drop_remaining_packet_flag=false;
        VC->expect_first_cell_flag=true;
/* Step 3.c: update cell drop and recv counters */
if (drop_cell==true)
    cell drop counters
else
    update(increment) queuelengths as shown in Sec. 5.1.4
    add cell to appropriate VC queue
    else
        Q_{BAG,U}=Q_{BAG,U}-1;
        Q_{TOT,U}=Q_{TOT,U}-1;
```

With the optional parts removed the above code simplifies to:

```
Q_{VC,R+U}=Q_{VC,R}-1;
Q_{BAG,R+U}=Q_{BAG,R+U}-1;
if (Q_{VC,R+U}≧MIN_{VC,R}) AND (Q_{BAG,R+U}≧MIN_{BAG,R})
    Q_{BAG,U}=Q_{BAG,U}-1;
    Q_{TOT,U}=Q_{TOT,U}-1;
```

What is claimed is:

1. An apparatus for serving ATM packets, each packet having cells, comprising:

a server which provides service to a cell;

a scheduler mechanism which determines which cell is to receive service from the server, said scheduler mechanism connected to the server; and a shared memory mechanism having a first region for storing cells of a first packet of a first connection and at least a second region for storing cells of a second packet of a second connection, each region having a dynamic size determined by demands of the corresponding connections which changes whenever there is a load change to the region while the region is receiving cells from the respective connection and after the connection is established.

2. An apparatus as described in claim 1 wherein storage of a cell of the first packet in the first region is independent of the scheduler mechanism.

3. An apparatus as described in claim 2 wherein the first region includes a first buffer administration group and the second region includes a second buffer administration group.

4. An apparatus as described in claim 3 wherein the scheduler mechanism includes a scheduler connected to the server for determining which cell is to receive service from the server at a given time and a connection management mechanism connected to the scheduler and the shared memory mechanism for reading the cell chosen by the scheduler from the associated buffer administration group of the shared memory mechanism.

5. An apparatus as described in claim 4 wherein the shared memory mechanism includes a controller which defines each buffer administration group in the shared memory mechanism.

6. An apparatus as described in claim 5 wherein the controller assigns each connection to one and only one buffer administration group.

7. An apparatus as described in claim 6 wherein the controller defines a dynamic threshold which adapts to changes in traffic conditions for each buffer administration group, said threshold identifying the number of cells the buffer administration group can store.

8. An apparatus as described in claim 7 wherein the controller defines a minimum threshold for each buffer administration group which identifies a minimum number of cells for each buffer administration group.

9. An apparatus as described in claim 8 wherein the controller defines a maximum threshold for each buffer administration group which identifies a maximum number of cells for each buffer administration group.

10. An apparatus as described in claim 9 wherein the controller assigns a weight to each buffer administration group which the controller uses to determine the dynamic threshold of the buffer administration group.

11. An apparatus as described in claim 10 wherein the controller tracks the number of cells in each buffer administration group and compares the number of cells in each buffer administration group to each of the thresholds of the buffer administration group to determine if another cell which arrives at the associated buffer administration group is within the thresholds of the associated buffer administration group so the arriving cell can be accepted for storage in the associated buffer administration group or the arriving cell is dropped.

12. An apparatus as described in claim 11 wherein the controller includes an automatic threshold controller which suggests the dynamic threshold of each buffer administration group.

13. An apparatus as described in claim 12 wherein the first connection is a unicast connection and the second connection is a multicast connection.

14. An apparatus as described in claim 13 wherein the first buffer administration group is comprised of a third buffer administration group.

15. An apparatus as described in claim 3 wherein each buffer administration group is defined by $$T^i(t)=\alpha_i(B-Q(t))=\alpha_i(B-\Sigma_i Q^i(t))$$

where $\alpha$ is a constant, T is the control threshold, where $Q^i(t)$ is the queue length of cells to port i at time t and B is space in buffer.

16. An apparatus for serving ATM packets, each packet having cells, comprising:

a server which provides service to a cell;

a scheduler mechanism which determines which cell is to receive service from the server, said scheduler connected to the server; and a shared memory mechanism having a buffer management module having buffer administration groups for receiving cells of packets from connections, each buffer administration group having a dynamic threshold which adapts to changes in traffic conditions whenever there is a load change to the buffer administration group while the buffer administration group is receiving cells of packets from connections and after the connections are established, said threshold identifying the number of cells the buffer administration group can store.

17. A method for serving cells of ATM packets comprising the steps of:

storing a cell of an ATM packet of a first connection and a first buffer administration group of a shared memory;

changing a dynamic threshold defining the number cells the first buffer administration group can store whenever there is a load change to the buffer administration group while the buffer administration group is receiving cells of packets from connections and after the connections are established; and receiving another cell at the first buffer administration group.

18. A shared memory mechanism comprising:

a first region for storing cells of a first packet of a first connection; and at least a second region for storing cells of a second packet of a second connection, each region having a dynamic size determined by demands of the corresponding connections which changes whenever there is a load change to the region while the region is receiving cells from the respective connection and after the connection is established.

19. A shared memory mechanism comprising:

a first region for storing cells of a first packet of a unicast connection; and at least a second region for storing cells of a second packet of a multicast connection, each region having a dynamic size determined by demands of the corresponding connections which changes whenever there is a load change to the region while the region is receiving cells from the respective connection and after the connection is established.

20. A shared memory mechanism comprising:

a first buffer administration group for storing cells of a first packet of a first connection;

at least a second buffer administration group for storing cells of a second packet of a second connection, each buffer administration group having a dynamic size determined by demands of the corresponding connections whenever there is a load change to the buffer administration group while the buffer administration group is receiving cells of packets from connections and after the connections are established; and a controller which defines each buffer administration group, said controller assigns a weight to each buffer administration group which the controller uses to determine the dynamic threshold of the buffer administration group.

21. A shared memory mechanism comprising:

a first region for storing cells of a first packet of a first connection; and at least a second region for storing cells of a second packet of a second connection, each region having a dynamic size determined by demands of the corresponding connections which changes whenever there is a load change to the region while the region is receiving cells from the respective connection and after the connection is established, said first region having a third region within it for storing cells of a third packet of a third connection.

* * * * *